Patented Dec. 3, 1946

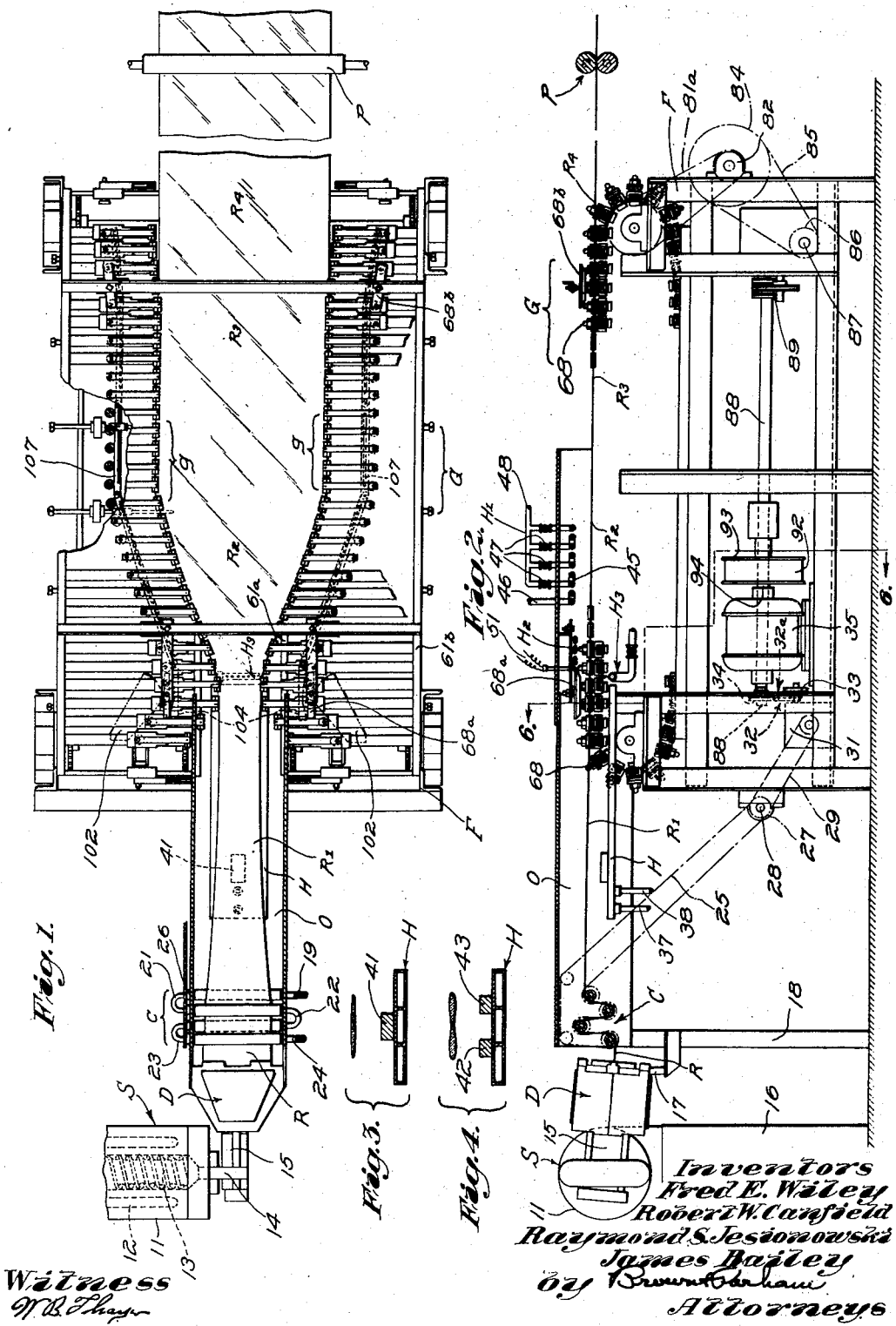

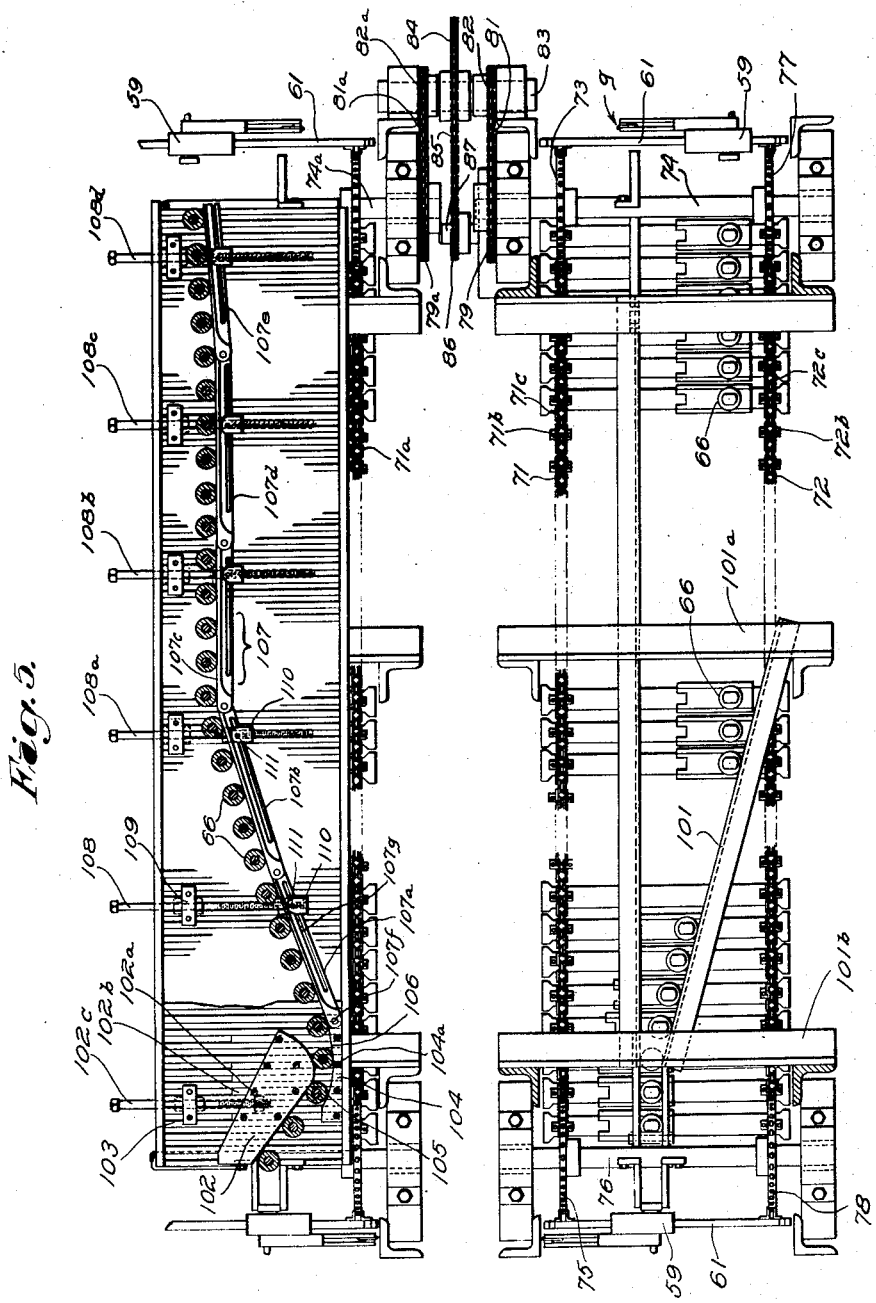

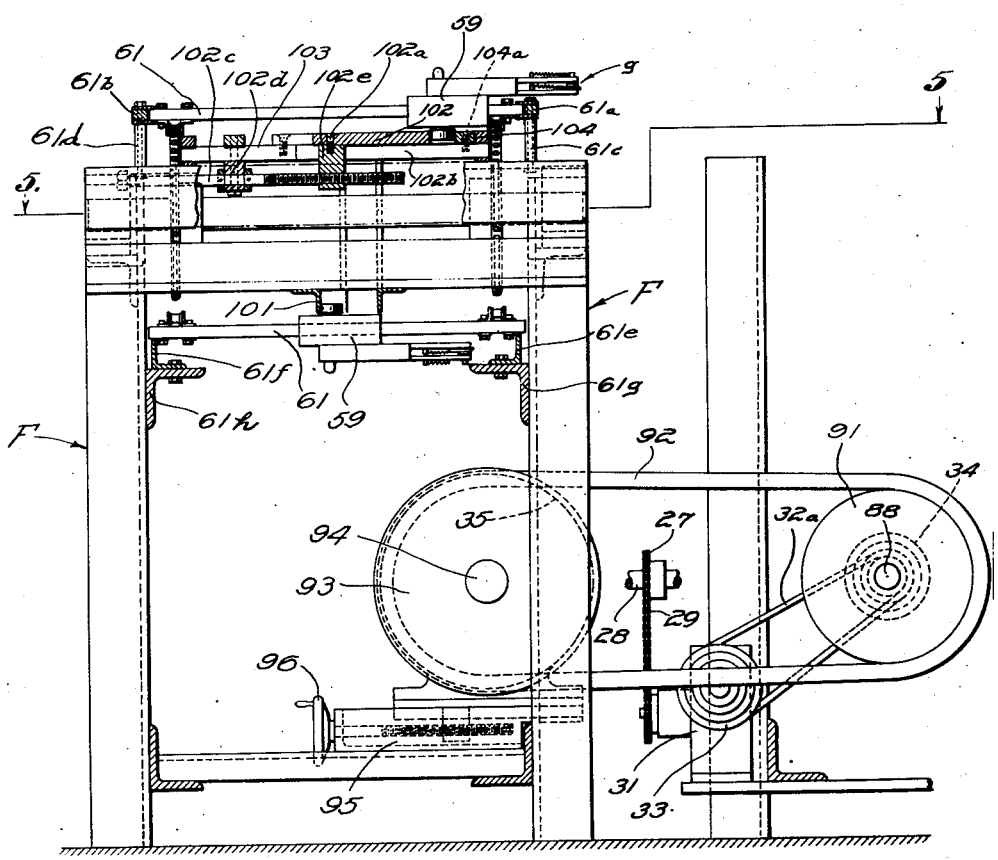

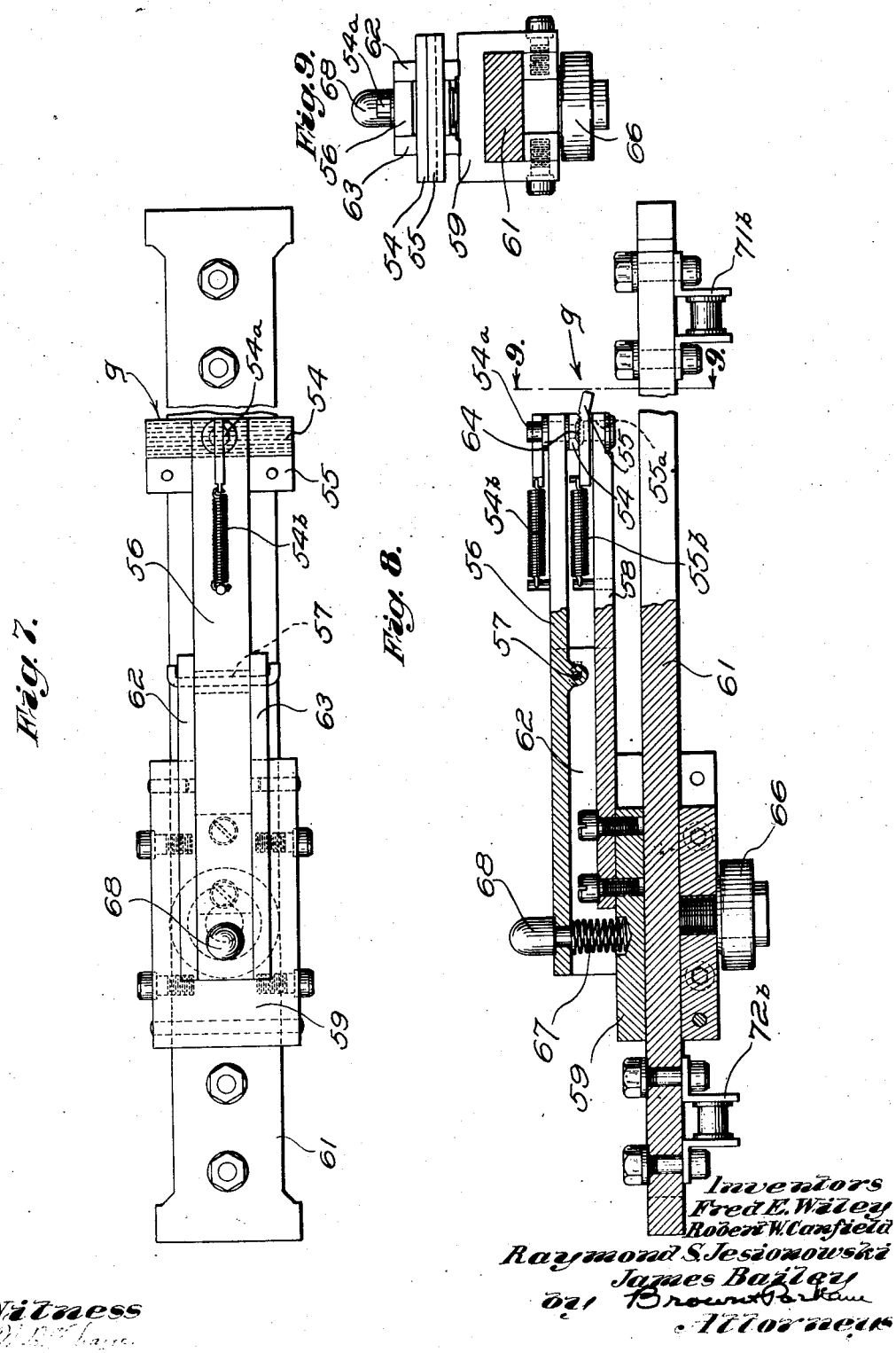

2,412,187

UNITED STATES PATENT OFFICE 2,412,187

PROCESS AND APPARATUS FOR PRODUCING CONTINUOUS SHEET OF BIAXIALLY ORIENTED ORGANIC POLYMER

Fred E. Wiley, Hartford, Robert W. Canfield, West Hartford, Raymond S. Jesionowski, Hartford, and James Bailey, West Hartford, Conn., assignors to Plax Corporation, Hartford, Conn., a corporation of Delaware Application August 17, 1943, Serial No. 498,970

8 Claims. (Cl. 18—12)

This invention relates to the production of continuous sheet of biaxially oriented organic polymer and has particular relation to the production of such sheet by heating and extruding such polymer in the form of a ribbon and drawing the ribbon longitudinally and transversely to form the oriented sheet in the desired width and thickness.

It is well known that the strength of certain organic polymers, such as synthetic long chain or straight chain polymers, may be substantially increased by drawing so as to orient the molecules of the polymer in the direction or directions in which the stress is applied. Examples of such polymers are vinyl compounds or derivatives, such as polystyrene, vinyl chloride and copolymers of or including such compounds or derivatives.

It has been proposed to form biaxially oriented sheet from an organic polymer by extruding a ribbon of the polymer and simultaneously drawing the ribbon in longitudinal and transverse directions to orient the polymer. But simultaneous longitudinal and transverse drawing is objectionable because the amount of resulting orientation in one direction is dependent upon, and limited by, the amount of orientation in the other direction and this may limit the amounts of orientation in both directions. Such limitations are due to the fact that the desired longitudinal stretching is prevented by the engagement of relatively fixed transverse drawing devices with the edges of the ribbon. Also such devices may so cool the edges of the ribbon as to interfere further with longitudinal drawing and orientation.

It also has been proposed to produce oriented sheet by rolling a previously formed sheet while in more or less plastic condition. But the rolling method is very inefficient because the polymer flows much more in the central portion of the sheet in a longitudinal direction than it does at the edge portions and very little transverse flow can occur between the rolls. In rolling, the polymer cannot always be kept as soft as desired because of sticking to the rolls. In general it may be said that in rolling organic polymer to form oriented sheet control of orientation is very difficult, if not impossible, both as regards the temperature and viscosity of the polymer and the application of stress.

The general object of this invention is to provide a novel process and novel apparatus for the continuous production of biaxially oriented sheet whereby the objections and disadvantages of prior processes and apparatus may largely or entirely be overcome and biaxially oriented sheet, having the desired transverse and longitudinal orientation and the desired thickness and width, may be produced efficiently and cheaply.

More specifically, it is an object of this invention to provide a novel method and novel apparatus wherein and whereby a continuous ribbon of organic polymer is extruded and is biaxially oriented by drawing it first in one direction only and then in the other direction, and each drawing operation is performed under predetermined conditions of temperature and application of stress so that the desired degree of orientation in each direction and the desired relative amounts of orientation in the two directions are obtained in the finished sheet. Thus, sheet may be produced which is of approximately equal strength in both transverse and longitudinal directions and such strength is of high order.

Another object is to provide for unusually rapid and efficient continuous drawing of a ribbon of organic polymer, more particularly transverse drawing thereof to form a relatively wide sheet from a relatively narrow ribbon. This is especially advantageous where, as in the preferred form of the present invention, the ribbon first is drawn in a longitudinal direction only because this makes the ribbon narrower and requires an unusually large transverse drawing to attain a high degree of transverse orientation and to form a relatively wide sheet.

A further object of the invention is to provide novel apparatus for first longitudinally and then transversely drawing an extruded ribbon of organic polymer in which means provided for transversely drawing ribbon also serves to draw the ribbon longitudinally.

Another object of the invention is to provide a novel apparatus of the above type including novel means for gripping and transversely drawing the organic polymer.

Other objects and advantages of the invention will be brought out in the following specification or will be apparent therefrom or from the accompanying drawings to which the specification refers, which drawings depict one embodiment of the novel apparatus for performing the novel process and in which:

Figure 1 is a more or less diagrammatic view in top plan on reduced scale of apparatus embodying the invention and in which parts are broken away or omitted for clarity in illustration:

Fig. 2 is a view in vertical sectional elevation and in more or less diagrammatic form of the apparatus shown in Fig. 1 from which some of the parts shown in Fig. 1 are omitted and to which some parts not shown in Fig. 1 are added;

Fig. 3 is a view in vertical transverse section of a ribbon of non-uniform thickness and of heating means of Figs. 1 and 2 illustrating the heating of such ribbon;

Fig. 4 is a view similar to Fig. 3, illustrating the heating of a different form of ribbon from that shown in Fig. 3;

Fig. 5 is a view in horizontal sectional top plan on enlarged scale taken approximately on the line 5—5 of Fig. 6 and illustrating cam means by which transverse drawing of the ribbon is controlled;

Fig. 6 is a view in vertical sectional elevation on enlarged scale taken approximately on the line 6—6 of Fig. 2 looking in the direction of the arrows;

Fig. 7 is a view in top plan on further enlarged scale of one of the grippers or gripper units of the apparatus shown in Figs. 1 to 6;

Fig. 8 is a view partly in vertical section and partly in side elevation of the gripper unit shown in Fig. 7; and Fig. 9 is a view in transverse vertical section taken approximately on the line 9—9 of Fig. 8.

Referring first to Figs. 1 and 2, it will be seen that the principal parts of the apparatus include a stuffer S for heating organic polymer and delivering it to and forcing it through an extrusion die D in the form of a flat ribbon R; a group of rolls C, four of such rolls being shown, over which the ribbon R passes; an oven O in which the rolls C are mounted and in which the portion of the ribbon indicated at R1 is drawn longitudinally as hereinafter explained, the oven containing a heating plate H for regulating the temperature therein; a gripping and drawing mechanism indicated generally at G and comprising two endless series of opposed grippers g for gripping the ribbon to draw it; and a pair of puller rolls indicated at P for maintaining longitudinal tension on the ribbon and sheet.

As shown in Fig. 2, heating means H1 is provided in oven O above the portion R2 of the ribbon where it is drawn transversely and another heating device indicated at H2 is located in oven O above the ribbon to heat it in advance of the heater H1. A third heating means is provided at H3 below the ribbon slightly in advance of the heater H2.

The stuffer S may be of known construction and as shown comprises a cylinder 11 containing a heating jacket 12 for circulation of a suitable heating medium, such as oil, to heat the organic polymer in the stuffer to the desired temperature. The stuffer S contains a screw 13 for working the organic polymer while it is being heated and for forcing it through connections indicated at 14 and 15 into and through the die D. The stuffer S is mounted on a suitable support, as shown at 16, and the die D may be supported in part by its connection to the stuffer and by an additional support shown at 17 which is mounted on the frame 18.

The rolls C have passages therethrough for the circulation of a tempereature controlling medium, preferably a cooling liquid, which flows into one of the rolls through a pipe 19, and from that roll into the other rolls through U-shaped connectors 21, 22 and 23, being discharged through the last roll through a pipe 24. The rolls C are all driven at the desired speed by means of a chain 25 which engages sprockets on the rolls, one of which is indicated at 26, the chain 25 in turn being driven by a sprocket 27 on a shaft 28, Figs. 2 and 6, which shaft in turn is driven by a chain 29 through reduction gear 31. Reduction gear 31 is driven through a variable speed drive, indicated at 32, Fig. 2, which comprises stepped pulleys, pulley 33 on the reduction gear and pulley 34 on the shaft 88 driven from motor 35, as hereinafter explained. See Fig. 6. The speed at which the rolls C are driven may be varied by shifting the belt 32a on the stepped pulleys, as will be understood. Any other suitable variable speed drive may be used in place of drive 32.

The oven O encloses the ribbon from near where it is extruded from the die D to a point where the sheet may be exposed to the atmosphere, as shown for example in Fig. 2. The oven O not only provides for control of the temperature of the ribbon but also prevents drafts from coming into contact with the ribbon which might chill the ribbon and interfere with the drawing operations. The heater H may be of any known type and as shown is of the hollow plate type having inlet and outlet pipes 37 and 38 for the delivery and discharge of a suitable heating medium such as oil.

As will be more fully explained hereinafter, the heating of the portion R1 of the ribbon by the heater H may be varied transversely of the ribbon by means of block 41, Figs. 1, 2 and 3, or blocks 42 and 43, Fig. 4.

The heater H1 may be of the coil type comprising a plurality of coils 45 to which a heating medium such as oil is admitted through a pipe 46 and from which the heating medium may be taken off through valve controlled take-offs 47 leading to the discharge pipe 48. By adjustment of the valves in the take-offs a longitudinal temperature gradient may be maintained over the sheet or the temperature of the space of the sheet may be maintained at a uniform or other desired temperature. The heater H2 may be an electric resistance heater of known type to which current is supplied through connections indicated at 51. The heater H3 as shown is of the gas type in the form of a burner which, as indicated in Fig. 1, extends transversely below the ribbon near the end of the heater H.

Considering now the construction of the gripping and drawing mechanism G, it will be seen that grippers g are arranged in the form of two endless series which may be and as illustrated are supported and operated by conveyor means of identical construction at both sides of the apparatus, that is, at opposite edges of the ribbon or sheet. Also the grippers g may be identical in construction so that a description of one will suffice for all.

Each gripper g forms part of a gripper unit mounted on the respective gripper conveyor means for transverse sliding movement outwardly of the ribbon or sheet to effect a transverse drawing operation and to clear the sheet and inwardly of the apparatus to permit gripping of the narrow ribbon preparatory to the transverse drawing operation. In addition each gripper is pivotally mounted so that it may yieldingly assume a position parallel to the edge of the sheet irrespective of whether the edge of the sheet is parallel to the center line of the apparatus or forms an angle therewith.

As best shown in Figs. 7, 8 and 9, each gripper g comprises an upper jaw 54 and a lower jaw 55, the upper jaw being mounted on a vertical pivot 54a in lever 56 on pivot 57 and the lower jaw 55 being mounted on vertical pivot 55a on bar 58 attached by screws as shown to slide 59 on guide 61. The pivot 57 for lever 56 is mounted in members 62 and 63 on slide 59 which members also serve as guides for the rear end portion of the lever 56.

The jaws 54 and 55 are grooved, as indicated at 64, to afford a good grip on the edge of the ribbon and prevent it from pulling out from between the jaws. The jaw 54 is yieldingly held at right angles to the lever 56 and guide 61 by a tension spring 54b and jaw 55 is similarly held in such position by a tension spring 55b connected thereto, as shown. Such springs permit the gripper g to yieldingly adjust itself to any change in the direction of the edge of the sheet, more particularly to be turned at an angle to the guide 61 when the ribbon is transversely drawn with its edges in diverging relation. This swivelling action of the grippers prevents them from wrinkling or otherwise distorting the ribbon which would occur if the jaws of the grippers could not turn horizontally. It will be understood that the tension springs 54b and 55c serve to return the gripper to a position at a right angle to the guide 61 when the transverse drawing operation is finished and the edges of the sheet are parallel to each other and to the center line of the apparatus.

Slide 59, which carries the gripper g, is moved inwardly and outwardly on the guide 61 by engagement of cam roller 66 on the bottom of the slide with cams which are described below and which are arranged to move the grippers inwardly to grip the ribbon and outwardly to apply transverse stress thereto.

The gripper g normally is held closed by a compression spring 67 positioned between the top of slide 59 and the outer end of lever 56. The gripper is opened by the application of pressure to a button 68 on the outer end of the lever 56 and above the spring 67. Such pressure is successively applied to the grippers as they are brought into position to engage the ribbon, by means of an adjustable, stationary cam 68a, Fig. 2, the button 68 being moved into engagement with the one end of the cam and depressed thereby to open the gripper and then moving out of engagement with the cam to permit the gripper to close on the edge of the ribbon. Similarly each gripper is opened to release the sheet by means of cam 68b, located near the end of mechanism G, Fig. 2. After releasing the sheet, the gripper is closed and remains closed until again opened by cam 68a.

The conveying means for each set or series of grippers g comprises a pair of chains, as best shown by Fig. 5, wherein the lower flights of an inner chain 71 and an outer chain 72 are illustrated. Chain 71 is driven by sprocket 73 on drive shaft 74 and engages an idle sprocket 75 on shaft 76 at the other end of the mechanism. Similarly, the chain 72 is driven by sprocket 77 on shaft 74 and passes around an idle sprocket 78 on shaft 76.

The sprocket shaft 74 carries a sprocket 79 on the inner end thereof engaged and driven by chain 81 from sprocket 82 on shaft 83. Shaft 83 carries a main sprocket 84 driven by chain 85 from a sprocket 86 (see Fig. 2) on shaft 87 which shaft takes power off the main drive shaft 88 through clutch 89.

As shown in Fig. 6, shaft 88 carries a pulley 91 engaged by a belt 92 which passes over pulley 93 on shaft 94 of motor 35. Motor 35 and pulley 93 are mounted on a slide 95 adjustable by means including the hand wheel 96 to vary the speed at which the motor drives shaft 88. Such variation in speed results from change in the radial position of belt 92 in pulley 93 which, while not so shown in the drawings, is so constructed that when the motor is moved toward or away from shaft 88 the belt 92 moves outwardly or inwardly of the pulley. The construction of such a variable speed drive is well known per se and need not be further described nor illustrated.

The shaft 83, Fig. 5, from which chains 71 and 62 are driven, as described above, also drives the other pair of chains from the other set of grippers, one of which is indicated at 71a, Fig. 5. For this purpose the shaft 83 is provided with an additional sprocket 82a and driving chain 81a on sprocket 79a of sprocket shaft 74a. Further description of this other pair of chains and the drive therefor is unnecessary because in the illustrated embodiment these parts are duplicates of corresponding parts for the chains 71 and 72.

The various grippers or gripper units are connected to the chains, such as chains 71 and 72, by roller links 71b and 72b bolted respectively to the inner and outer ends of the guides 61 as shown in Figs. 5 and 8. The roller links 71b and 72b constitute parts of the chains 71 and 72 respectively, there being additional links 71c and 72c, Fig. 5, interposed between the roller links of adjacent gripper units.

It will be understood that the sprocket shafts and drive shafts are suitably journaled in the frame F of the mechanism G.

The upper flight of the guides 61 are guided at their ends and thus caused to travel in a horizontal plane, by guides indicated at 61a and 61b, Figs. 1 and 6, mounted on the top of the frame F by means of supports 61c and 61d. Also the lower flight of guides 61 slide on angle irons 61e and 61f mounted in the frame F by means of angle iron supports 61g and 61h.

Considering now the cam means for controlling the inward and outward movement of the slides 59 to effect corresponding movements of the grippers g and referring particularly to Figs. 1, 5 and 6, it will be seen that as the grippers in the lower flight move rearwardly of the apparatus, the rollers 66 on the slides 59 come into contact with the straight diagonally positioned cam 101, Figs. 5 and 6. The cam 101 is held in horizontal position in the frame F by transverse angle irons 101a and 101b, Fig. 5. A similar cam (not shown) is provided at the other side of the apparatus for the same purpose. Thus, an initial inward movement is imparted to the grippers as they reach the end of their travel in the lower flight and before they are carried around and into the upper flight.

When the grippers or gripper units travel into the upper flight of the conveyor the rollers 66 of one set of gripper units successively engage a cam 102 adjustably mounted on the grill 103. This serves to impart further inward movement of the slides 59 and grippers carried thereby, such inward movement being assisted by an additional cam 104, Fig. 5, the outer edge portion 105 of which is engaged by the rollers near the end of their engagement with cam 102. Cam 104 is so shaped as to provide an outwardly directed edge portion 106 for initiating outward movement of the slides 59 and grippers carried thereby as a result of the action thereof on the rollers 96. Further outward movement of the rollers is effected by a relatively long sectional cam 107 also mounted on the grill 103 and which is adjustable thereon as will presently be described.

As shown in Figs. 1 and 5, cams 102, 104 and 107 are provided for both sets of conveyor chains for the actuation of the respective sets of grippers carried thereby inwardly and outwardly of mechanism G so that the same movements are imparted to opposed grippers in opposite directions.

Cams 102 and 104 are attached by means of screws 102a and 104a to slides 102b mounted for transverse adjustment in slots of grill 103. Thus, cams 102 and 104 may be adjusted inwardly or outwardly as a unit to change the path of movement of the grippers g, such adjustment being effected by means of a screw 102c rotatably mounted in the support 102d in grill 103 and threaded through a lug 102e secured to the underside of cam 102.

The cam 107 comprises the sections 107a, 107b, 107c, 107d and 107e, the section 107a being pivotally connected at 107f to the cam 104. The section 107a is in turn pivotally connected to section 107b, section 107b to 107c and 107c to 107d. Each of said sections is slotted as indicated at 107g.

Adjustment of the sectional cam 107 is effected in part by the adjustment of cam 102 by screw 102c and by additional screws 108, 108a, 108b, 108c and 108d, Fig. 5. Said screws are mounted on the underside of the grill 103 by supports such as indicated at 109 and are connected to the respective cam sections by nuts, such as indicated at 110, through which the screws are threaded, each nut carrying a pin 111 which extends upwardly and into a slot 107g of the associated cam section.

From the foregoing description of cams 102 and 104 and of cams 107 and their respective adjusting means, it will be seen that the paths of movement of the two sets of grippers g may be shifted in accordance with desired variations in width of the portion R1 of the ribbon where initially engaged by the grippers and so as to draw the ribbon into sheet of varying widths. Also the rate of transverse drawing may be varied, and is controlled, by altering the shape of cam 107 by changing the positions of its sections. Thus the sections 107a and 107b may be moved outwardly or inwardly by screws 108 and 108a to change the shape of that portion of the cam 107 formed by those sections which effect transverse drawing. See Fig. 2. Sections 107c and 107d may be and preferably are adjusted into a straight line parallel to the center line of the mechanism and of the ribbon so that the edges of the ribbon will be held in, and can set, in parallel relation to each other while so held under stress by grippers g. Section 107e preferably is adjusted in outwardly diverging relation to section 107d sufficiently to move the grippers clear of the sheet after releasing it, as illustrated in Fig. 2.

It will be understood that the two sets of cams which control the movement of the two sets of grippers usually are adjusted to positions equidistant from the center line of the mechanism G and of the ribbon or sheet so that the paths of the grippers of each opposed pair will be similarly located and the ribbon will be drawn and formed symmetrically with respect to its center line.

Operation

In the operation of the above described apparatus for the performance of the novel process, the organic polymer from which biaxially oriented sheet is to be formed is heated to good working condition in the stuffer S while in a solvent free condition, continuously extruded through the die D and continuously conveyed by the rolls C and drawn first longitudinally and then transversely by the grippers g while maintained at a predetermined temperature or temperatures in oven O by the heaters H and H1 supplemented if desired by the heaters H2 and H3. Preferably the organic polymer is heated in the stuffer S to a substantially higher temperature than that at which the drawing operation is performed in the oven O in order to extrude it in as homogeneous condition as possible and to facilitate the extrusion of the polymer in ribbon form. When the polymer is so heated, it is necessary to reduce its temperature substantially for drawing and orientation. In other words, drawing and orientation usually is performed according to the invention at a substantially lower temperature than that to which the polymer is heated for extrusion. Such reduction in temperature may be effected by the rolls C by the circulation of a cooling medium therethrough.

The extruded ribbon passes around the rolls C and is driven by the rolls at a predetermined speed obtained by proper adjustment of the variable speed drive 32. Preferably the rolls C are driven at such speed that the thickness of the ribbon R between the die and the first roll is not substantially reduced. Thus, there is no substantial stretching of the ribbon between the end of the die and the rolls. The driving of the ribbon by the rolls C may be facilitated by so controlling the temperature of the rolls that the ribbon adheres somewhat to the rolls.

Preferably the temperature effect of the rolls on the ribbon is so regulated as to superficially chill the ribbon, leaving more or less heat in the ribbon to assist in reheating it to predetermined or selected temperature for the drawing operations. The chilling and reheating of the ribbon assists in bringing it to a substantially uniform temperature throughout its cross section.

Usually the reheating of the ribbon in the oven O is assisted by the heater H. The oven and the heater are made sufficiently long to accomplish the desired longitudinal drawing and elongation of the ribbon, preferably without any transverse drawing and to permit predetermined temperature conditioning of the ribbon.

Under some conditions of operation it is very difficult to extrude the ribbon through the die D with a uniform cross section. In cases where the cross section is non-uniform difficulties arise in drawing the ribbon because the thicker portions tend to stretch or draw out too rapidly due to their greater heat mass. It has been found that this difficulty may be largely, if not entirely, overcome by variably reheating the ribbon transversely thereof in such manner that the thicker portion or portions is or are heated less than the thinner portion or portions. Thus, if the ribbon is extruded in the shape illustrated in Fig. 3, which shows the ribbon thicker near the center than at the edges, the edges may be heated more than the center portion by placing a block 41 of wood or other insulating material on the heater H directly beneath the thicker portion as illustrated in Figs. 1 and 3. This serves to mask the heating of the thicker central portion of the ribbon. One or more of such blocks may be provided. Similarly, if the edge portions of the ribbon are thicker than the central portion, as illustrated in Fig. 4, blocks 42 and 43 of wood or other insulating material may be placed on the heater H to inhibit the heating of such portions.

The longitudinal drawing of the portion R1 of the ribbon is effected by the longitudinal pull on such portion exerted by the grippers g as they continuously convey the ribbon and the sheet through the apparatus. The amount of elongation of the ribbon is predetermined by the relative speeds at which the rolls C and the grippers g are driven. Such relative speeds may be adjusted by means of the variable speed drive from the motor 35 to the gripper conveyor chains, that is by turning wheel 96, Fig. 6, and by the variable speed drive 32, Fig. 2, through which the rolls C are driven. The linear speed of the grippers g preferably is several times greater than that of the rolls C. For example, the linear speed of the grippers may be approximately four times greater than that of the rolls.

While some of the grippers g are effecting the longitudinal drawing of the portion R1 of the ribbon, others of them draw the portion R2 of the ribbon transversely as a result of the outward movement of the opposed grippers effected by the cams 107, it being understood that the rate and amount of such transverse stretching will be predetermined by the adjustment of the cams. The portion R2 of the ribbon preferably is maintained at a selected or predetermined temperature best suited for orientation of the organic polymer of the ribbon, by means of the heater H1, supplemented if necessary or desirable by the heater H2. The heater H2 may be employed in the production of unusually thin sheet, for example, sheet which is .002 to .005 of an inch thick. This usually is necessary because such exceedingly thin sheet cools very rapidly as it is drawn and unless maintained at the desired temperature the sheet may tear during the drawing operation.

Usually the heater H3 will not be employed during normal operations but is used to heat the ribbon when the apparatus first is started up in order to assist in stretching it so that the edges may be brought out to where the grippers can engage them.

When the grippers have drawn the ribbon transversely to its final width, it may be brought out of the oven into the atmosphere to permit it to cool. The portion of the ribbon at R3, or some of it, is undergoing such cooling and this is continued, while the sheet or ribbon still is engaged and held under stress by the grippers, until the temperature of the ribbon falls below the "transition temperature" of the organic polymer. The "transition temperature" of the organic polymer is that temperature at which internal stress may be relieved, the stress drops rapidly, high elasticity sets in and excessive "cold flow" takes place. The "transition temperature" of the polymer may be determined by the method described in "Transition temperature and cubical expansion of plastic materials," by Fred E. Wiley, Industrial and Engineering Chemistry, volume 34, page 1052, September 1942. If desired, forced cooling may be used to lower the temperature of the ribbon.

The grippers need not be released from the sheet immediately after its temperature has dropped below the transition temperature of the polymer but are not released before such time because if they should be, relaxation of orientation might occur.

Fig. 1 shows that the grippers have been disengaged from the portion R4 of the sheet and moved outwardly of its edges so that the grippers may be carried downwardly and beneath the apparatus without striking the sheet.

Preferably, longitudinal tension is maintained on the sheet and the ribbon by the puller rolls P in order to inhibit or prevent longitudinal relaxation of orientation during the transverse drawing operation and while the ribbon or sheet is being cooled to or below the transition temperature. In the event such relaxation occurs, it may be compensated by excessive elongation of portion R1 of the ribbon, for example, by elongation up to ten per cent (10%) and as high as twenty per cent (20%) in excess of that required for the predetermined longitudinal orientation in the finished sheet.

Although in the illustrated construction, the transverse drawing operation is effected solely by the transverse outward sliding movement of the grippers, the transverse drawing may be assisted or increased by arranging the sets of conveyor chains, which carry two sets of grippers, in diverging relation so that the ends of the sets of chains are farther apart at the discharge end of the apparatus than they are at the other end of the apparatus.

The process and apparatus of the invention may be used for producing biaxially oriented sheet from various types of organic polymers. Specifically, but without being limited thereto, the invention contemplates the production of such sheet from polystyrene, starting for example with polystyrene molding powder which may have a molecular weight of approximately 30,000 to 200,000 and an average molecular weight range of 70,000 to 100,000. Articles produced from polystyrene ordinarily are very brittle, but being a long chain type of polymer and containing relatively long molecules, the polymer can be greatly strengthened by application of directional stresses to orient the molecules in the direction of stress application. Although it is difficult to form a ribbon of polystyrene of uniform viscosity and to orient it, these difficulties are largely or entirely overcome by the present invention, first, because of the manner in which the polymer is heated and the temperature of the ribbon controlled, second, because of the performance of the longitudinal and transverse drawing operation in separate steps under controlled conditions of stress application, and, third, by the novel means for drawing the ribbon whereby sufficient stress may be applied at the proper time to achieve a high degree of orientation in the finished sheet.

In the production of biaxially oriented sheet from polystyrene in accordance with the invention, polystyrene molding powder may be heated to a temperature of 370° F., or to a higher temperature, in the stuffer S, superficially chilled by the rolls C by circulating water therethrough at approximately 160° F., and stretched longitudinally while maintained at a temperature of approximately 253° F., and then transversely while maintained at a temperature of approximately 255° F. There may be a temperature drop in the ribbon between the rolls C and the point where it is first gripped by the grippers g. After the ribbon has been drawn to the final width of the sheet, it is cooled to below the transition temperature of polystyrene which is 180° F., while held under stress by the grippers g. At a desired time thereafter the grippers may be disengaged from the sheet.

The longitudinal drawing may result in an elongation of the ribbon of three to four times the unit of length before elongation, this narrowing the ribbon to approximately .58 to .50 times its width as extruded from the die D. Similarly, the transverse drawing operation may increase the width three to four times that of the ribbon as extruded from die D, this being almost 6 to 8 times the width of the ribbon just after it has been drawn longitudinally. At the selected temperatures of drawing specified by way of example above, sheet is obtained which is well oriented because at such temperatures the rate of release of orientation under tension is relatively slow and the total relaxation is not substantial in one minute of time.

Preferably, the longitudinal and transverse drawing are so conducted that the orientation and strength of the sheet are equal in both said directions. However, the drawing may be so performed that orientation in one direction will exceed that in the other direction by a predetermined amount.

Various changes may be made in the process and apparatus as described above without departing from the scope of the appended claims.

Having thus described our invention, what we desire to claim is:

1. Apparatus for forming continuous, biaxially oriented sheet of solvent-free organic polymer comprising a screw stuffer for working and extruding said polymer, means for heating said stuffer to heat the solvent-free polymer to a selected working temperature, a die connected to said stuffer for forming the polymer into a ribbon when extruded therethrough by said stuffer, a set of cooperative rolls positioned for cooperative contact with said ribbon in advance of and adjacent to said die, means to drive said rolls at a speed suitably related to the rate of extrusion of the ribbon from said die to cause said rolls to contact with successively extruded portions of said ribbon and to conduct them away from said die without sufficient pull on the portion of the ribbon between said rolls and die to cause substantial stretching thereof, said rolls being sufficient in number and so arranged in relation to one another and to said die that any pull on the ribbon beyond said rolls will be prevented by said rolls from reaching the portion of the ribbon between the rolls and the die, means for circulating a cooling medium through said rolls to cause them to chill superficially the portions of the ribbon contacted thereby, an oven through which said ribbon may pass on leaving said rolls, heating means in said oven for maintaining the ribbon at approximately a selected temperature at which substantial orientation may be introduced into the solvent-free polymer by the application thereto of directional stresses, means for regulating the heating of said ribbon by said heating means transversely of the ribbon, and means for applying said directional stresses to said ribbon comprising gripper conveyor means located a substantial distance from said rolls, opposed grippers carried by said conveyor means in endless paths at opposite sides of the path of travel of said ribbon, transverse slides on the conveyor for supporting the grippers thereon, means for actuating the respective grippers to grip the edges of said ribbon, means for driving the gripper conveyor means at a selected linear speed greater than the linear speed of said rolls to draw the ribbon longitudinally and to elongate it while its edges are free whereby said ribbon is caused to contract in width prior to its engagement by said grippers, means for bodily sliding said grippers inwardly of said conveyor means into position to engage the edges of said ribbon, means actuating said grippers to slide them bodily outwardly of said conveyor means to draw the ribbon transversely a predetermined amount, and means for causing the grippers to release the sheet thus formed and to move them clear of the edges of said sheet.

2. Apparatus for forming continuous biaxially oriented sheet of solvent-free organic polymer comprising means including a die for extruding solvent-free polymer at a selected extruding temperature in the form of a ribbon, means positioned adjacent to said die to superficially chill each successive portion of the extruded ribbon and to maintain substantially constant the dimensions of each portion of the ribbon between the die and said means, means for causing said superficially chilled ribbon to attain a uniform temperature throughout sufficiently high that it is capable of being stretched and oriented but below the temperature at which the ribbon is extruded, and means for thereafter stretching said ribbon while at approximately said last mentioned temperature both longitudinally and transversely to orient the same.

3. Apparatus for forming continuous biaxially oriented sheet of solvent-free organic polymer comprising means including a die for extruding solvent-free polymer in the form of a ribbon at a selected extruding temperature above the transition temperature for the polymer, chilling rolls positioned adjacent to said die to act on each successive portion of the extruded ribbon to superficially chill it to a temperature below the transition temperature of the polymer and to maintain substantially constant the dimensions of each portion of the ribbon between the die and said chilling rolls, means for causing said superficially chilled ribbon to be reheated and to attain a uniform temperature throughout sufficiently high that it is capable of being stretched and oriented but below the temperature at which the ribbon is extruded, means for thereafter stretching said ribbon while at approximately said last mentioned temperature both longitudinally and transversely to orient the same, and for thereafter retaining stress on said ribbon while cooling to retain orientation therein.

4. Apparatus for forming continuous biaxially oriented sheet of solvent-free organic polymer comprising means including a die for extruding solvent-free polymer in the form of a ribbon at an extruding temperature above the transition temperature for the polymer, chilling rolls positioned adjacent to said die to act on each of successive portions of the extruded ribbon to superficially chill them to a temperature below the transition temperature of the polymer and to maintain substantially constant the dimensions of each portion of the ribbon between the die and the chilling rolls, means for causing said ribbon to be reheated to a substantially uniform temperature above the transition temperature so that the ribbon is capable of being stretched and oriented by the apparatus through the application thereto of directional stress to cause orientation thereof but below the temperature at which the ribbon is extruded, and means for applying such stresses to said ribbon while it is maintained at approximately said temperature comprising means acting first to draw an edge-free portion of said ribbon longitudinally only to elongate and narrow it a predetermined amount and then to draw the ribbon transversely to form a sheet of the final thickness desired and of a width in excess of the width of the ribbon before elongation and narrowing thereof, and means for regulating the amount of transverse drawing and the amount of longitudinal elongation to control the amounts of orientation respectively in said two directions in the finished sheet.

5. Apparatus for forming continuous biaxially oriented sheet of solvent-free polystyrene comprising means including a die for extruding solvent-free polymer in the form of a ribbon at a selected extruding temperature above 180° F., means including fluid cooled rolls over which the ribbon passes for superficially chilling the ribbon to a temperature of approximately 160° F. and for maintaining the dimensions of the ribbon substantially constant between the die and the rolls, means for causing said superficially chilled ribbon to attain and maintain a uniform temperature throughout sufficiently high that the ribbon is capable of being stretched and oriented by the application thereto of directional stresses but below the temperature at which the ribbon is extruded, and means for applying such stresses to said ribbon comprising gripper conveying means located a substantial distance from said rolls, opposed grippers carried by said conveying means in endless paths at opposite sides of the path of travel of said ribbon, means for actuating the respective grippers to grip the edges of said ribbon, means for driving the gripper conveyor means at a selected linear speed greater than the peripheral speed of said rolls to draw the ribbon longitudinally and to elongate it while its edges are free whereby said ribbon is caused to contract in width prior to its engagement by said grippers, means actuating said grippers to move them bodily and transversely in opposite directions to draw the ribbon transversely a predetermined amount, and means for causing the grippers to release the sheet thus formed and to move them bodily outwardly to clear the edges of said sheet.

6. The process of making a continuous sheet of oriented polymer which comprises the steps of heating said polymer in a solvent-free condition to extrusion temperature and extruding the heated polymer from a die in the form of a hot continuous ribbon and continuously forming said ribbon into said sheet by conveying the hot ribbon away from the die without substantially stretching it, superficially chilling successive portions of the ribbon when each such portion has moved a short distance away from the die, said chilling being in addition to any natural cooling of said ribbon by the surrounding atmosphere as the ribbon is extruded and conveyed away from said die and being such as to reduce substantially the surface temperature of the ribbon, leaving the interior at a higher temperature, reheating the chilled portions of the ribbon to establish in the surface layers and the interior thereof a substantially uniform temperature at which the polymer is capable of being stretched and oriented, said substantially uniform temperature being above the transition temperature of the polymer but below the temperature at which it was extruded, pulling the portion of the ribbon that has been brought to said substantially uniform temperature longitudinally and transversely while maintaining the temperature of the ribbon sufficiently high to stretch and orient the sheet, and cooling the sheet thus formed while holding the sheet under transverse and longitudinal stress.

7. The process of making a continuous sheet of oriented polymer which comprises the steps of heating said polymer in a solvent-free condition to extrusion temperature and extruding the heated polymer from a die in the form of a hot continuous ribbon and continuously forming said ribbon into said sheet by conveying the hot ribbon away from the die without substantially stretching it, superficially chilling successive portions of the ribbon as they are conveyed away from said die to reduce the surface temperature thereof below the transition temperature of the polymer and below the internal temperature thereof, reheating the chilled portions of the ribbon to establish in the surface layers and the interior thereof a substantially uniform temperature at which the polymer is capable of being stretched and oriented, said substantially uniform temperature being well above the transition temperature of the polymer but below the temperature at which it was extruded, pulling the portion of the ribbon that has been brought to said substantially uniform temperature longitudinally and transversely to stretch and orient the sheet while substantially maintaining the equalized temperature of the ribbon, and cooling the sheet thus formed to below the transition temperature while holding the sheet under transverse and longitudinal stress.

8. The process of making a continuous sheet of biaxially oriented polystyrene which comprises the steps of heating said polystyrene in a solvent-free condition to an extrusion temperature of at least 370° F. and extruding the heated polystyrene at the extrusion temperature from a die in the form of a hot continuous ribbon of substantially unoriented polystyrene and continuously forming said ribbon into said sheet by conveying the hot ribbon away from the die without substantially stretching it, superficially chilling a portion of the ribbon at a place adjacent to said die by subjecting the surface thereof to a chilling medium, having a temperature of approximately 160° F., reheating said chilled surface to establish through said portion of the ribbon a substantially uniform temperature of approximately 255° F., pulling said portion of said ribbon after it has attained substantially uniform temperature in a longitudinal direction only to elongate and orient it to several times its unoriented length and then transversely drawing the ribbon to substantially widen and orient it to several times its original unoriented width while maintaining the temperature of the ribbon at approximately 255° F., and, before substantial relaxation of said orientation, cooling the sheet thus formed to below 180° F. while holding the sheet under longitudinal stress.

FRED E. WILEY.
     ROBERT W. CANFIELD.
     RAYMOND S. JESIONOWSKI.
     JAMES BAILEY.